United States Patent
Amon et al.

(10) Patent No.: US 6,306,929 B1
(45) Date of Patent: Oct. 23, 2001

(54) BLEEDING INK FOR PRINTING SECURITY DOCUMENTS

(75) Inventors: Philippe Amon, Lausanne; Anton Bleikolm, Ecublens; Olivier Rozumek, St. Martin; Pandelis Papadimitriou, Morges, all of (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 09/405,215

(22) Filed: Sep. 27, 1999

Related U.S. Application Data

(63) Continuation of application No. 08/847,503, filed on Apr. 25, 1997, now abandoned.

(51) Int. Cl.$^7$ .............. C09D 11/02; C08J 3/24; C08J 3/28; C08G 59/00; C08F 2/46
(52) U.S. Cl. .............. 523/160; 523/161; 522/90; 522/100
(58) Field of Search ............ 283/117, 903, 283/96; 523/160, 161; 106/31.27, 31.28, 31.32; 522/90, 100

(56) References Cited

U.S. PATENT DOCUMENTS

| | | | |
|---|---|---|---|
| 4,205,018 | * | 5/1980 | Nagasawa et al. ............ 524/404 |
| 4,227,719 | * | 10/1980 | McElligott et al. ............ 283/92 |
| 4,457,430 | * | 7/1984 | Darling et al. ............ 206/459.1 |
| 4,505,944 | | 3/1985 | Turner ............ 427/8 |
| 4,603,162 | * | 7/1986 | Hasegawa et al. ............ 524/404 |
| 4,726,608 | * | 2/1988 | Walton ............ 283/96 |
| 5,209,515 | * | 5/1993 | Dotson et al. ............ 283/95 |
| 5,319,052 | * | 6/1994 | Prantl et al. ............ 528/48 |
| 5,591,527 | * | 1/1997 | Lu ............ 428/411.1 |
| 5,607,808 | * | 3/1997 | Nishizawa et al. ............ 430/137 |
| 5,658,964 | * | 8/1997 | Amon et al. ............ 522/31 |
| 5,698,296 | * | 12/1997 | Dotson et al. ............ 428/195 |
| 5,807,625 | * | 9/1998 | Amon et al. ............ 428/195 |
| 5,827,134 | * | 10/1998 | Sullivan et al. ............ 473/372 |
| 5,866,628 | * | 2/1999 | Likavec et al. ............ 522/135 |

FOREIGN PATENT DOCUMENTS 0 432 093 A1   12/1989   (EP).
2 229 189 A    9/1990    (GB).

OTHER PUBLICATIONS

Lewis, Sr., Richard J.; Hawley's Condensed Chemical Dictionary 13th Ed., John Wiley and Sons, New York (p. 1097), 1997.*

* cited by examiner

Primary Examiner—Vasu Jagannathan
Assistant Examiner—Callie E. Shosho
(74) Attorney, Agent, or Firm—Shoemaker & Mattare

(57) ABSTRACT

A bleeding or fugitive printing ink is disclosed and claimed which can be printed by the method of dry or wet offset or letterpress. This ink allows, when printed on security documents and dried, to prevent attempts of forgery or counterfeit in that the ink contains at least one dyestuff which is sensitive to organic solvents and other chemical reagents. The ink, when printed, forms a solid, polymerized or cross-linked binder matrix on the surface of the document when the printings are submitted to energy radiation, or by an oxypolymerization reaction. This matrix is formed near immediately, in the case of oxypolymerization within 24 hours, in contrast to conventional bleeding printing inks whose matrixes do not really dry and remain liquid in the interstices of the substrate.

17 Claims, No Drawings

BLEEDING INK FOR PRINTING SECURITY DOCUMENTS

This application is a continuation of application Ser. No. 08/847503 filed Apr. 25, 1997, now abandoned.

The present invention belongs to the field of the art of printing and describes a new and useful ink, a method of manufacturing an ink and the use of a composition as an ink which can be printed particularly by dry or wet offset by screen-, flexo- and gravure-printing as well as letterpress printing methods such as those used mainly on security documents. Such inks are also named "fugitive inks".

A great number of security documents are presently known; examples of such documents are bank checks, money transfer orders, identity cards, other identity documents such as passports and driver's licences, postal stamps, lottery tickets, airline transportation tickets, shares, certificates, affidavits and others.

All security documents should be protected against forgery or counterfeiting. The main threats are:

Total counterfeit where a document is reproduced in its entirety; or

Forgery where a document is altered by deleting and/or replacing information, for example the amount of money on a check, a signature on a driver's licence, or information on a passport.

In each case, a well selected security printing ink can contribute considerably to the security of the document.

Solvent bleeding printing inks are already known and have been used for a rather long time in the field of security inks. The protection conferred to the security document is established by a fading or even disappearance of the color, by a change in colour or by a bleeding off when the document is contacted with an organic solvent or any other chemical substance used as a falsifying reagent.

The application methods and the principles of the function of the bleeding or fugitive printing inks in contact with solvents and other chemical agents, are the following:

The inks can be printed specifically by dry or wet offset by screen-, flexo- and gravure-printing or by letterpress. They are composed of a vehicle or binder whose components are mineral oils and alkyd resins, one or more dyestuffs that are soluble in organic solvents and are the substances sensitive to said chemical agents, and different additives. The dyestuffs are mostly chromium complexes, cobalt complexes or copper phthalocyanine blue. The drying mechanism is a purely physical one and acts principally by penetration into an absorbing solid fibrous substrate. In fact, if drying is defined as a conversion of the liquid printing ink into a solid and stationary film on the substrate, these printing inks do not dry but remain "liquid"; however, they are sufficiently permanently entrapped within the interstices of the fibres of the substrate for their mobility to be drastically reduced. The absorption of such printing inks is partial and progressive, and several days after the printing are necessary for the printed document to show an apparently dry condition, typically 5 to 7 days. Only after that time can the printed substrate be further processed, for example in order to apply personalised information, i.e. by laser printer or ion deposition printer. Furthermore, the absorption capacity of the substrate determines the quality and the drying time.

Thus, the working principle of bleeding printing inks known to date is based on the fact that the matrix of the ink remains soluble in organic solvents and other chemical agents.

Now, the objective of the present invention is to provide printing inks for the above-mentioned printing processes that can be effectively dried to form a solid matrix but which also form a print that remains sensitive to solvents and other chemical reagents. Another objective of this invention is to provide bleeding security documents that will be at least in part printed with such inks.

The bleeding printing inks, printed layers, printed substrates, methods of making an ink composition of this invention which meet the objectives mentioned above are defined in the independent claims. The new use of an ink composition is also the subject matter of this invention. Special embodiments of the ink and the security documents are defined in the dependent claims.

The invention is based on the highly unexpected finding that it is possible to obtain a printing ink which bleeds in contact with organic solvents and other chemical reagents, this even if the formulation of the ink is based on a solid matrix which is formed when the liquid ink is transformed into a solid film on the substrate and wherein this solid film itself is resistant to said solvents and chemical reagents after drying. The condition necessary to obtain the required sensitivity to bleeding is the use of dyestuffs and colouring agents which are sensitive to said solvents and chemical reagents. That is, the soluble dyestuff is attacked by the said solvents and/or reagents whereas the said matrix remains unaltered.

Manufacturing of the inks of the present invention rely on the dispersion of the dyestuffs in the binder matrix which results in an ink product wherein substantially homogeneously distributed dye molecules, dye molecule aggregates and substantially undissolved and also substantially homogeneously distributed dye particles may coexist. The extent to which the dye particles are dissolved depends mainly on the dye/binder system. Complete dye solution will strongly and positively impact on colour development and therefore on the tinctorial strength of the prints whereas undissolved dye particles will adversely affect these characteristics.

When brought into contact with a dried print performed with an ink of the invention, solvents and/or reagents will diffuse through the binder matrix and reach dye molecules and particles causing them respectively to be washed-off or dissolved, leading to the so-called "bleeding effect". It is the surprising experience of the inventors that, provided the dyestuff is sensitive to the solvent or reagent, bleeding is necessarily observed.

The presence of porosities and defects in the dried ink film accounts probably much more for the penetration of the solvents or reagents than pure diffusion of molecules of the bleeding agent through the polymeric network formed upon curing of the binder matrix. A dried ink film whatever the printing technique used inevitably presents micro-defects and porosities of all kinds such as micro-voids, micro-cracks, bubbles and others wich are so many penetration paths for the bleeding agent.

Moreover, the roughness of the substrate may indirectly impact on the bleeding effect by disturbing the ink film structure and in situations where the ink film is very thin it will actually consist of discontinuous and unconnected areas more easily accessible to the solvents and the reagents than large and solid ink spots. This undoubtedly applies to an offset print on a standard cheque or bond paper where the 1 to 4 $\mu$m thick offset ink film is unable to compensate for the roughness of the substrate, the amplitude of which is at least 10 $\mu$m.

The binder matrix may also be made specifically porous. Porosity may be achieved by a variety of known techniques, such as using a solvent which evaporates and leaves micropores, by mixing incompatible compounds, by adding additives creating micropores and by other techniques.

The substantially homogeneous distribution of the dyestuff (molecules and/or aggregates and/or particles) in the binder matrix results in an ink layer containing substantially homogeneously distributed dyestuff. This results in dye molecules and/or aggregates and/or particles being distributed also on the surface or with very little coverage by the binder matrix which allows solvent to diffuse/reach the dye rather easily.

It is worthwhile to note that a poor colour development may favour a strong bleeding effect by reinforcing the contrast between untouched areas and those tested for bleeding.

Also of interest are all combinations between dyestuffs exhibiting a sensitivity toward different solvents or reagents. This will provide tamper evidence against attempts made by using various chemicals and therefore reinforce the protection of the document against falsification.

Combinations of such dyestuffs and conventional pigments offer interesting possibilities as well. A violet obtained by combining a blue fugitive dye and a red resistant one will turn to red upon contact with a solvent or reagent able to dissolve and extract the blue dye thus making the fraud obvious.

This new type of bleeding inks brings about the same or better protective effects on security documents than known bleeding inks which, however, have the serious drawbacks described above. In addition, the compounds forming a solid matrix have been found to have better abrasion resistance.

The bleeding printing ink of the present invention can be printed on absorbing substrates but also on non-absorbing ones since it does not need to penetrate into the substrate in order to be dried or to acquire an apparently dry condition. This advantageous property allows the user to get a much broader choice of substrates to print upon than with known bleeding inks.

A further, most advantageous property which has already been mentioned before is the considerable diminution of time necessary from the moment of printing until the drying and any post-treatments to which the printed substrates are typically subjected. The existing bleeding inks need several days for drying, 5 to 7 on average, whereas the printing inks of this invention can be processed immediately after printing when they are formulated to dry by radiation energy such as UV light or electron beam, or after approximately 24 hours when they are dried by oxypolymerisation.

As it has already been mentioned above, the known bleeding printing inks contain a matrix or binder system which remains liquid and soluble in organic solvents and other chemical agents even after drying. In contrast thereto, the bleeding printing ink of the present invention forms a matrix on drying which becomes solid and resistant to chemical agents. In the cases where the printings are dried, i.e. cured or crosslinked under UV radiation or electron beam, the matrix is composed of a binder system containing one or more radiation curing compounds. These compounds form a matrix which is solid and resists to chemical products after a chemical polymerisation reaction initiated by said radiation.

Compounds which are cured or crosslinked by radiation are known to the specialised ink manufacturer. Mainly, these compounds are oligomers of high or low viscosity. In the case where they are highly viscous substances, they are blended with liquid radiation curable monomers acting as viscosity regulators. These monomers are non-volatile and take part in the polymerisation reaction wherein they become solids.

The mechanism of polymerisation can be free radical, cationic or both, called hybrid.

If the bleeding printing ink is to be dried by UV radiation, it should contain a photoinitiation system in order to start the polymerisation reaction. Such systems are widely known to the specialist ink manufacturer.

In a free radical induced polymerisation, photoinitiators can undergo photocleavage (Norrish type I photoinitiators) or proceed by the abstraction of hydrogen from a suitable donor (Norrish type II photoinitiators), in order to generate free radicals. The chemical reactive free radical species thus created transfer their energy to the carbon-carbon double bonds provided by the unsaturated ink binder constituents, and then the chain propagation and chain termination steps occur. It is understood that the ink binder should contain unsaturated acrylic monomers and/or oligomers which may also be modified ones.

In a cationically induced polymerisation, the photoinitiators generate ionic species initiating the polymerisation. Materials that cure by cationic mechanism include, for example, epoxides and vinyl ethers. The propagation is achieved by the attack of heterocycles under ring opening and/or vinylic carbon-carbon double bonds.

It is possible to provide a hybrid curing system, that is, curing is achieved by both free radicals and cationic mechanisms.

If the bleeding ink is to be dried by electron beam radiation, the addition of a photoinitiation system is generally not necessary.

In the bleeding printing ink of the present invention which is dried by oxypolymerisation, the solid matrix that resists chemical products is obtained from a binder system similar to that of an ink drying by oxidation. The drying mechanism is an oxidation which implies a radical induced polymerisation of unsaturated fatty chains, brought about by atmospheric oxygen. This is a chemical reaction which may be catalysed or accelerated by siccatives or dryers which should be incorporated into the printing ink formulation.

The bleeding or fugitive printing ink of this invention contains one ore more dyestuffs as agents which are sensitive to organic solvents and other chemical agents. These dyestuffs are typically the same ones as those which are normally used in known bleeding inks.

As a general rule, the binder system of the bleeding printing ink according to the present invention makes up about 40 to about 85% by weight of the total ink weight. The dyestuff(s), as agents that are sensible to chemical reagents, comprise typically from about 5 to about 20% by weight of the total ink.

If the printing ink is designed to dry under UV radiation, the photoinitiator system contains an initiator and, optionally, a co-initiator. These compounds represent about 2 to about 15% by weight of the ink.

The amount of further components of the ink, for example extenders, pigments such as $TiO_2$ or $CaCO_3$, stabilisers, viscosity regulators, etc., is comprised between 0 and about 15% by weight of the printing ink.

The bleeding ink of the present invention affords the same or better level of protection on security documents than the inks already known, but comprises a binder matrix which resists the attack of organic solvents and other chemical reagents and which is obtained in a drying time duration much shorter than the known inks. Furthermore, the known bleeding inks produce printings which are not really dry and wherein the ink continues to migrate within the interstices of the fibres of the substrate. In contrast thereto, the printings obtained in using the inks of the present invention are stable, really dry and unable to migrate in or on the substrate. Still further, the present inks can be printed with excellent results on non-absorbing substrates such as plastic films.

The following Examples are given by way of explanation only and can by no means be interpreted as a limitation of the invention. In the Examples, all percentages are given by weight.

EXAMPLE 1

A bleeding ink that dries on ultraviolet (UV) radiation was prepared for wet offset printing, and the following products were blended on a three-roller mill:

| Product | amount, parts by weight |
| --- | --- |
| Aliphatic urethane triacrylate | 43.0 |
| Polyester acrylate (fatty acid modified) | 10.0 |
| Glycerol propoxytriacrylate (monomer) | 12.5 |
| Hydroquinone (stabiliser) | 0.5 |
| TiO2 (pigment) | 1.0 |
| CaCO3 (pigment) | 8.0 |
| Dyestuff C.I. Solvent Blue 67 (Ciba-Geigy) | 15.0 |
| Benzophenone | 7.0 |
| Isopropyl thioxanthone | 3.0 |

Paper was printed continuously with this printing ink at a speed of 150 m/min and dried under 3 UV lamps having a total power of 240 W/cm lin.

The printed paper was tested using organic solvents and other chemical products (such as acetone and/or ethanol) immediately after printing and then 4 weeks later. The sensitivity of the dried, printed ink to bleeding and to colour fading was perfect. The tests were made as follows:

Samples having a size of 20×30 mm were cut from the printed sheets after drying. These samples were immersed during 5 minutes with intermittent stirring in different organic solvents, for example acetone, ethanol, higher boiling alcohols, trichloroethylene, etc. The samples were removed after 5 minutes and dried, and their colour was compared with the untreated paper sheet.

If a "drop text" (deposition of a drop of solvent/reagent on the print) is performed using the same solvents, bleeding is observed with a staining of the non-printed areas surrounding the printed pattern.

EXAMPLE 2

A bleeding ink that dries by oxypolymerisation was prepared for dry and wet offset printing, and the following products were blended on a three-roller mill:

| Product | amount, parts by weight |
| --- | --- |
| Varnish | 40 to 60 |
| Alkyd resin (Alsynol PN 66 from DMS) | 15 to 25 |
| Dyestuff (Neopen Yellow from BASF) | 15 to 20 |
| Wax (Polytron 90 from Lawter) | 4 to 5 |
| Siccative (cobalt naphthenate) | 1 to 2 |
| Oxidation inhibitor (hydroquinone) | 0.3 to 0.5 |
| Silica (Aerosil 200 from Degussa) | 1 to 3 |

The varnish is composed of a phenolic resin (Albertol KP 648, Hoechst), a bleached linseed oil, and a mineral oil (PKWF 28/131, Haltermann).

The ink was printed on paper sheets by the offset printing process, and the printed paper was dried in open air. The drying was complete after about 24 hours. Tests with organic solvents and other chemical products were conducted on samples of the printed sheets after 24 hours and 4 weeks later. The sensitivity of the dried ink to bleeding and colour fading was excellent. The tests were made according to the method described in Example 1.

EXAMPLE 3

A UV-drying bleeding ink for screen printing was prepared according to the following formulation;

| Product | Amounts, Parts by weight |
| --- | --- |
| epoxy acrylate | 15.0 |
| oligoamine | 25.0 |
| qlycerol propoxytriacrylate (monomer) | 30.0 |
| dianol-diacrylate(monomer) | 15.0 |
| hydroquinone (stabiliser) | 0, 5 |
| dyestuff C.I. solvent b1ue 67 | 10.0 |
| isopropyl thioxanthone | 1.0 |
| 2-methyl-1 [4-(methylthio)phenyl]-2-morpholino-propanone-1 | 3.5 |
| anti-foaming agent | 3.0 |

The ink was printed using a flat-bed screen machine. The drop test using acetone and ethanol gave clearly visible bleeding and staining.

The security documents to be printed with the bleeding inks of the present invention can be printed, entirely with prints from the new bleeding inks of the present invention, but it is also possible to print only those locations or regions where forgery is to be expected.

What is claimed is:

1. A method for authenticating a security document, said method comprising steps of:
   providing a printing ink comprising at least one dye in a quantity of 5% to 20% by weight of the total weight of the ink, said dye being soluble in at least one organic solvent and at least one crosslinkable printing ink binder,
   applying a layer of said printing ink onto a substrate,
   drying and curing said printing ink layer under the influence of energy radiation thus forming a crosslinked binder matrix,
   authenticating the document by subjecting the dried and crosslinked layer to said organic solvent and observing for movement of the dye.

2. A method according to claim 1, wherein said crosslinkable printing ink binder is selected from the group consisting of compounds capable of forming a crosslinked binder matrix under the influence of energy radiation inducing a free radical, cationic or anionic polymerization mechanism.

3. A method according to claim 1, wherein said crosslinkable printing ink binder is selected from the group consisting of epoxy acrylates, polyester acrylates and polyurethane acrylates, said acrylates being optionally modified, epoxides, vinyl ethers, and mixtures thereof.

4. A method according to claim 1, wherein the energy radiation is ultraviolet light.

5. A method according to claim 1, wherein the energy radiation is an electron beam.

6. A method according to claim 1, wherein the organic solvent is acetone and/or ethanol.

7. A method for authenticating a security document, said method comprising steps of:
   providing a printing ink comprising at least one dye in a quantity of 5% to 20% by weight of the total weight of the ink, said dye being soluble in at least one organic solvent and at least one crosslinkable printing ink binder, applying a layer of said printing ink onto a substrate, drying and curing said printing ink layer by oxypolymerization thus forming a crosslinked binder matrix, authenticating the document by subjecting the dried and crosslinked layer to said organic solvent and observing for movement of the dye.

8. A method according to claim 7, wherein said crosslinkable printing ink binder comprises a phenolic resin and a drying oil.

9. A method according to claim 7, wherein said crosslinkable printing ink binder comprises at least one alkyd resin.

10. A method according to claim 7, wherein said crosslinkable printing ink binder is selected from the group consisting of epoxy acrylates, polyester acrylates and polyurethane acrylates, said acrylates being optionally modified, epoxides, vinyl ethers, and mixtures thereof.

11. A method according to claim 7, wherein the organic solvent is acetone and/or ethanol.

12. A security substrate having a dried and cured printed ink layer comprising at least one dye soluble in at least one organic solvent, said dye making of from 5% to 20% by weight of the printing ink, and at least one crosslinking printing ink binder said ink layer being dried and cured under the influence of energy radiation thus forming a crosslinked binder matrix, said security document being authenticable by subjecting the dried and crosslinked ink layer to an organic solvent.

13. A substrate according to claim 12, wherein the thickness of the print ink layer is in the range of 1 to 4 mm.

14. A substrate according to claim 12, wherein the surface roughness of the substrate is at least 10 $\mu$m.

15. A security substrate having a dried and cured printed ink layer comprising at least one dye soluble in at least one organic solvent, said dye making of from 5% to 20% by weight of the printing ink, and at least one crosslinking printing ink binder said ink layer being dried and cured by oxypolymerization thus forming a crosslinked binder matrix, said security document being authenticable by subjecting the dried and crosslinked ink layer to an organic solvent.

16. A substrate according to claim 15, wherein the surface roughness of the substrate is at least 10 $\mu$m.

17. A substrate according to claim 15, wherein the thickness of the print ink layer is in the range of 1 to 4 mm.

* * * * *